United States Patent Office 2,972,639
Patented Feb. 21, 1961

2,972,639

PROCESS FOR THE PREPARATION OF FLUOROHYDROCARBONS

Travis E. Stevens, Huntsville, Ala., assignor to Rohm & Haas Company, Philadelphia, Pa., a corporation of Delaware No Drawing. Filed Aug. 24, 1959, Ser. No. 835,394

6 Claims. (Cl. 260—653.8)

This invention concerns a process for the preparation of fluorohydrocarbons. More particularly, it concerns a straightforward process which produces fluorine derivatives in high yields from readily available raw materials.

The term "fluorohydrocarbon" as used throughout this application refers to difluoro or trifluoro aliphatic hydrocarbons. The fluoro group may be the only substituent of the aliphatic hydrocarbon, or the hydrocarbon may be further substituted with halo groups such as fluorine, chlorine, or bromine. The fluorohydrocarbons of the present invention are represented by the formula

in which X is fluorine, hydrogen or methyl and R is selected from the group consisting of lower alkyl, lower haloalkyl in which the halo group has an atomic number from 9 to 35, and lower alkenyl.

The term "lower alkyl" as used throughout the specification and the claims cover alkyl radicals containing 1 to 4 carbon atoms. "Lower haloalkyl" denotes alkyl groups containing 1 to 4 carbon atoms, mono-, di-, or poly-halo substituted, said halo group being fluorine, chlorine or bromine. "Lower alkenyl" as used herein is an alkenyl group containing 2 to 4 carbon atoms.

The type of compounds prepared by the process of the present invention are known in the prior art, having been produced by other processes. Thus, U.S. Patent 2,478,932 covers a process for the preparation of 1,1,1-trifluoroethane by the passage of 1-chloro-1,1-difluoroethane over an aluminum fluoride catalyst at temperatures not less than 250° C. and not greater than 500° C. However, only about one-third of the reaction product is 1,1,1-trifluoroethane, the balance being a mixture of chlorinated hydrocarbons and unsaturated hydrocarbons. Other prior art processes which depend on the replacement of a halogen atom (other than fluorine) by fluorine give similar complex mixtures. Direct fluorination of hydrocarbons with elemental fluorine has also been proposed, but the difficulties and dangers inherent in handling fluorine are well known.

An object of this invention is to provide a process for the preparation of high purity fluorohydrocarbons in high yields. A further object of this invention is to provide a process for the preparation of high purity fluorohydrocarbons from readily available low cost raw materials.

The fluorohydrocarbons produced by the process of the present invention represent a well-known class of compounds with a variety of important uses. Depending on the boiling point, they may be used as propellants in aerosol bombs, or as heat transfer agents in refrigeration systems. When one of the substituents is a $CH_2=CH-$ group, the compound can be polymerized or copolymerized to produce high molecular weight polymers with high fluorine content.

It has been found that nitriles react with bromine trifluoride to replace the nitrogen of the nitrile with fluorine. The reaction proceeds readily at low temperature and is actually so exothermic that cooling of the reaction mixture is generally necessary. The nitrile is dissolved in hydrogen fluoride or iodine pentafluoride and the bromine trifluoride added to the solution incrementally. When the reaction is complete, the products are recovered by distillation from the reaction mixture.

The nitriles suitable for use in the process of this invention are of the general formula

in which R is a lower alkyl group containing 1 to 4 carbon atoms, a lower monohaloalkyl, lower dihaloalkyl, or lower polyhaloalkyl group containing 1 to 4 carbon atoms and the halo group is fluorine, chlorine or bromine, or a lower alkenyl group containing 2 to 4 carbon atoms. Typical examples of such nitriles include acetonitrile, propionitrile, butyronitrile, isobutyronitrile, monochloroacetonitrile, γ-bromobutyronitrile, dichloroacetonitrile, acrylonitrile, methacrylonitrile, allyl cyanide and methallyl cyanide.

Methyl ketones as described hereinafter will also react with $BrF_3$ in the presence of HF or $IF_5$ to yield difluoro hydrocarbons of the general formula

in which $R_1$ may be hydrogen or methyl and $R_2$ is lower alkyl.

The solvents suitable for the reaction include hydrogen fluoride, iodine pentafluoride, or mixtures thereof. Although iodine pentafluoride can be used as such, it presents operating difficulties due to the fact that it melts at 10° C. and boils at 100° C. Mixtures of iodine pentafluoride with hydrogen fluoride are more easily handled. When mixtures of hydrogen fluoride and iodine pentafluoride are employed, a ratio of HF to $IF_5$ of about 2 to 1 is preferred. Liquid hydrogen fluoride represents, however, the preferred solvent.

The molar ratio of bromine trifluoride to the nitrile is not too critical, and it may range from about 2.5 moles to 1 mole to about 1 mole to 1.5 moles. However, a 1 to 1 molar ratio is the theoretical ratio and is often preferred in practice.

The temperature of the reaction mixture can be varied appreciably depending on the particular reactants employed. Thus, it may vary from about −40° C. to about 10° C. A range of from −20° C. to −10° C. is the preferred operating range.

The reaction between bromine trifluoride and nitriles and ketones is exothermic, the degree of exothermicity depending on the particular nitrile or ketone being employed. Cooling of the reaction mixture is generally required.

The reaction is conducted in an inert atmosphere; that is, under a nitrogen or helium sweep. Since bromine trifluoride reacts with water, the reactants and the reaction mixture must be maintained in an anhydrous condition.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

*Fluorination of acetonitrile in hydrogen fluoride*

A mixture of 0.87 g. (0.0212 mole) of acetonitrile and 10 ml. of anhydrous hydrogen fluoride in a 60 ml. Kel-F test tube was cooled in a liquid nitrogen bath while bromine trifluoride, about 0.05 mole, was condensed on the walls of the tube in vacuo. The cooling bath was then removed and the hydrogen fluoride solution allowed to melt. The flow of bromine trifluoride from the wall of the tube into the solution was controlled with a Dry Ice bath; a vigorous reaction occurred as the trifluoride contacted the solution. The exit gases from the test tube were swept by a helium stream through soda lime and Drierite towers and through traps cooled to $-78°$ and $-196°$. Expansion of the material trapped at $-196°$ gave 381 cc. (STP) (0.017 mole, 80%) of 1,1,1-trifluoroethane contaminated by a trace of perfluoroethane. The identity of the trifluoroethane was established by its mass spectrum, its infrared spectrum (identical with that of an authentic specimen), and its molecular weight (M.W. found: 83, 84; calculated: 84).

EXAMPLE II

*Fluorination of acetonitrile in iodine pentafluoride*

A mixture of 0.87 g. (0.0212 mole) of acetonitrile and 10 ml. of iodine pentafluoride in a 60 ml. Kel-F test tube was cooled in a Dry Ice-methylene chloride bath while bromine trifluoride, about 0.05 mole, was condensed on the walls of the tube in vacuo. The cooling bath was removed, the iodine pentafluoride-acetonitrile mixture was melted by the application of external heat, and the bromine trifluoride was allowed to contact the solution as described in Example I. The exit gases were collected as described in Example I; a total of 364 cc. (STP) (0.0162 mole, 76%) of 1,1,1-trifluoroethane was collected. The infrared spectrum and mass spectrum of this material were identical with those of the 1,1,1-trifluoroethane produced as described in Example I.

EXAMPLE III

*Fluorination of α-chloroacetonitrile*

A mixture of 2.38 g. (0.0315 mole) of α-chloroacetonitrile and 50 ml. of anhydrous hydrogen fluoride in a 250 ml. polyethylene bottle was stirred magnetically and cooled by a $-20°$ bath while 0.10 mole of bromine trifluoride in 15 ml. of hydrogen fluoride was added dropwise. The exit gases were collected as described above, material was observed collecting in both the $-78°$ and $-196°$ traps. After addition of the bromine trifluoride, the mixture was stirred 2 hours at 0° to 10°, then the residual hydrogen fluoride and bromine trifluoride was poured on ice and discarded. The cold traps collected a total of 498 cc. (STP) of 1,1,1-trifluoro-2-chloroethane (70% yield), identified by mass spectrum and infrared spectrum (identical with that of an authentic specimen).

EXAMPLE IV

*Fluorination of propionitrile*

Five ml. of bromine trifluoride in 30 ml. of anhydrous hydrogen fluoride in a 250 ml. polyethylene bottle was stirred at $-15°$ while 3.0 ml. (0.0425 mole) of propionitrile was added dropwise. The exit gases from the bottle were swept by a helium stream through soda lime and Drierite towers and through a trap cooled to $-196°$. After the addition of the propionitrile, the reactor was allowed to warm to 15° and stirring was continued until almost all of the hydrogen fluoride had evaporated. Expansion of the material trapped at $-196°$ gave 822 cc. (STP) (0.0367 mole, 86%) of 1,1,1-trifluoropropane. The infrared spectrum of the trifluoropropane was identical with that of an authentic specimen and a vapor phase chromatogram did not show the presence of other materials. Molecular weight: calculated 98; found: 97, 97.

EXAMPLE V

*Fluorination of acrylonitrile*

A solution of 1.0 ml. of acrylonitrile in 10 ml. of iodine pentafluoride was treated with bromine trifluoride as described in Example II. The material trapped at $-196°$ was a mixture of nitrous oxide, 1,1,1-trifluoro-2-propene and other unidentified fluorocarbons. The 1,1,1-trifluoropropene was identified by mass spectrum and infrared spectrum.

EXAMPLE VI

*Fluorination of butyronitrile*

A mixture of 2.0 ml. (0.023 mole) of butyronitrile, 0.043 mole of iodine pentafluoride and 30 ml. of anhydrous hydrogen fluoride was stirred at $-20°$ while 0.10 mole of bromine trifluoride in 15 ml. of hydrogen fluoride was added slowly. The exit gases were scrubbed and collected as described in Example I. The mixture was stirred one hour at 0° to 10° after the bromine trifluoride addition. There was collected a total of 145 cc. (STP) of gaseous product (28% calculated as 1,1,1-trifluorobutane) whose mass spectrum showed 1,1,1-trifluorobutane to be the major product.

EXAMPLE VII

*Fluorination of isobutyronitrile*

A solution of 0.023 mole of isobutyronitrile in 30 ml. of anhydrous hydrogen fluoride was treated with 0.10 mole of bromine trifluoride as described in Example III. The reaction mixture was stirred at 15° until the hydrogen fluoride solution had evaporated. The cold traps collected a total of 355 cc. (STP) (69% calculated as 2-(trifluoromethyl)-propane) of gaseous product, identified as 2-(trifluoromethyl)-propane from its mass spectrum. Molecular weight: calculated 112; found: 112.3, 111.4.

EXAMPLE VIII

*Fluorination of methyl ketones*

The general method is as follows: A solution of 0.022 mole of methyl ethyl ketone in anhydrous hydrogen fluoride was treated with bromine trifluoride as described above, except that the reaction temperature was maintained at $-40°$ during the first half of the addition and at $-20°$ during the remainder of the reaction. From the cold traps was collected 0.012 mole of 1,1-difluoroethane, identified by mass spectrum, infrared spectrum (identical with that of an authentic specimen) and molecular weight. Calculated molecular weight: 66; found: 66.5.

By allowing the reaction temperature to rise to 20° so that some of the hydrogen fluoride distills from the reactor and is destroyed in the soda lime towers, essentially quantitative yields of the difluoroalkane are obtained.

EXAMPLE IX

*Fluorination of acetone*

Two ml. of acetone was added to 4 ml. of bromine trifluoride in 40 ml. of hydrogen fluoride cooled to $-15°$ in the manner described in example IV for propionitrile. The exit gases were collected in the same fashion. There was obtained 564 ml. (STP), 92.5% of 2,2-difluoropropane, B.P. 2.5° (760 mm.), reported B.P. $-0.1°$. The infrared, proton and fluorine n.m.r., and mass spectra of the sample were consistent with the assigned structure. Calculated molecular weight, 80; found: 80.3, 80.4. The purity of the sample was confirmed by a vapor phase chromatogram.

I claim:

1. A process for the preparation of fluorohydrocarbons which comprises reacting bromine trifluoride in an inert anhydrous atmosphere in the presence of a solvent selected from the group consisting of hydrogen fluoride and iodine pentafluoride and mixtures thereof with a compound of the formula R–CN in which R is selected from the group consisting of lower alkyl, lower haloalkyl in which the halo group has an atomic number from 9 to 35, and lower alkenyl, and separating the fluorohydrocarbons so formed.

2. A process as set forth in claim 1 in which the solvent is liquid hydrogen fluoride.

3. A process as set forth in claim 1 in which the ratio of bromine trifluoride to compound of the formula R–CN is from about 2.5 to 1 to about 1 to 1.5.

4. A process as set forth in claim 1 in which the reaction temperature is from about $-40°$ C. to $+10°$ C.

5. A process as set forth in claim 1 in which the reaction temperature is from $-20°$ C. to $-10°$ C.

6. A process as set forth in claim 1 in which the inert anhydrous atmosphere is selected from the gases consisting of nitrogen and helium.

References Cited in the file of this patent

UNITED STATES PATENTS

| | | |
|---|---|---|
| 2,471,831 | McBee et al. | May 31, 1949 |
| 2,489,970 | McBee et al. | Nov. 29, 1949 |
| 2,702,306 | Gall et al. | Feb. 15, 1955 |